UNITED STATES PATENT OFFICE.

JONATHAN T. TROTTER, OF NEW YORK, N. Y.

IMPROVEMENT IN VULCANIZING INDIA-RUBBER.

Specification forming part of Letters Patent No. 7,816, dated December 3, 1850; Reissue No. 988, dated June 19, 1860.

*To all whom it may concern:*

Be it known that I, JONATHAN T. TROTTER, of the city, county, and State of New York, have invented certain new and useful Improvements in Curing or Vulcanizing India-Rubber, Gutta-Percha, or other Vulcanizable Gums or Compounds thereof; and I do hereby declare the following to be a full description of the same.

The object of my invention is to vulcanize the rubber or other vulcanizable gums or compounds thereof by means of an artificial preparation of zinc and sulphur, without the use of raw or free sulphur, to avoid thereby the potash-boiling process common to all raw-sulphur-curing processes, to remove the excess of sulphur from the surface of the rubber so cured, as well as the sun-drying process consequent thereon, and thereby save labor and time; second, to vulcanize the rubber or other vulcanizable gums or compounds thereof by means of an artificial preparation of zinc and sulphur, as hereinafter set forth, of a white color, or nearly so, without the use of raw or free sulphur, so as to be applicable to fancy-colored fabrics; third, to vulcanize the rubber or other vulcanizable gums or compounds thereof by an artificial preparation of zinc and sulphur, as hereinafter set forth, without the use of raw or free sulphur, so that it can be applied to fancy-colored silk, wool, or fur fabrics, which cannot be done by any of the raw or free sulphur processes for curing rubber on account of having to be boiled in a solution of potash to remove the excess of sulphur from the surface of the rubber, which would destroy the texture of such animal fiber, as well as destroy all coloring-matter in them.

The nature of my invention consists in the new and useful method or process of curing a vulcanizing india-rubber or other vulcanizable gums or compounds thereof by means of an artificial preparation of zinc and sulphur combined together, which may be called a "hyposulphite of zinc."

In making the compound of zinc and sulphur (called "hyposulphite of zinc" in my original patent) I use the following formula: I first boil the flowers of sulphur in a solution of caustic lime, potash, or other caustic alkali till the liquor is completely saturated. I then pass through it a stream of sulphrous-acid gas or the fumes of burning sulphur, to obtain what may be called a "hyposulphite of potash" or similar product. The liquor is then allowed to cool, when it is decanted into another vessel in which is a solution or mixture of the nitrate or other salt or preparation of zinc, which mixes or combines with the sulphured potass-liquor, and is deposited at the bottom of the vessel in a gray or white powder, which may be called a "hyposulphite of zinc;" but whether it is such, technically, is immaterial, as I do not base my invention upon the making of the article, but on its use when made by any method whereby a product is obtained having the chemical constitution, qualities, and properties of such an artificial preparation of zinc and sulphur, substantially as described, as will cure or vulcanize india-rubber or other vulcanizable gums or compounds thereof.

The method of using and working my process is as follows: I take the article I have called "hyposulphite of zinc" after it has been washed and dried, and grind it to an impalpable powder in any suitable mill. When thus prepared, it is mixed with the rubber or other vulcanizable gums or compounds thereof in the proportion of about three pounds of the compound to ten pounds of the gum, and thoroughly ground in the ordinary mill for such purposes till the gum and composition is one homogeneous mass. In this condition it is applied to the fabric or made up into goods, when it is subjected to a heat of about 260° to 280° Fahrenheit, for some three to five hours, more or less, according to the nature of the material, which completely cures or vulcanizes the rubber or other vulcanizable gums or compounds thereof.

Having now described my invention and the operations of the same, I will proceed to set forth what I claim and desire to secure by Letters Patent of the United States.

What I claim is—

The process or method of curing india-rubber, gutta-percha, or other vulcanizable gums or compounds thereof by means of a hyposulphite of zinc or other artificial preparation of zinc and sulphur having like chemical constitution, properties, and qualities, as hereinbefore described, for vulcanizing india-rubber and other vulcanizable gums or compounds thereof, without the use of raw or free sulphur for the purposes of curing the rubber, as hereinbefore described.

JONA. T. TROTTER.

Witnesses:

CHARLES L. BARRITT,
ALBERT SMITH.